Patented Feb. 8, 1949

2,461,191

UNITED STATES PATENT OFFICE 2,461,191

VACUUM DISTILLATION OF TRIMETHYL-AMINE FROM DIMETHYLAMINE

Dale F. Babcock, Wilmington, Del., assignor to E. I. du Pont de Nemours & Company, Wilmington, Del., a corporation of Delaware No Drawing. Application October 21, 1947, Serial No. 781,257

3 Claims. (Cl. 202—52)

1

This invention relates to distillation processes for the separate recovery of dimethylamine and trimethylamine from the mixture of said amines. It is more particularly directed to a fractional distillation process in which a pressure of less than 500 mm. Hg absolute is used to separate dimethylamine and trimethylamine from a mixture of the amines.

Trimethylamine boils at about +3° C. at atmospheric pressure and dimethylamine boils at about 6.8° C. Based on these data alone, it would appear that a mixture of the amines could be separated into its pure components by careful fractional distillation. The art teaches, however, that such a separation is not possible because di- and trimethylamine form an azeotropic mixture at all pressures. Thus various methods, less desirable than a straight-forward fractional distillation, have been developed for the separate recovery of dimethylamine and trimethylamine from mixtures of the amines.

In U. S. Patent 2,049,486, there is given a process for separating di- and trimethylamine from mixtures of the amines by using two distillation steps at different pressures. The process is based first, on a recognition of the formation of an azeotropic mixture between di- and trimethylamine at all pressures, second, on the discovery that the vapor pressure curves of di- and trimethylamine cross at a pressure of about 55 lbs. per sq. in., and third, on the discovery that the composition of the azeotropic mixture changes with the pressure.

Another method which has been proposed for separating dimethylamine and trimethylamine from a mixture of the amines requires the treatment of the amine mixture with an acid such as hydrochloric acid to precipitate a mixture of the solid amine hydrochlorides. By careful fractional crystallization, pure dimethylamine hydrochloride and pure trimethylamine hydrochloride can be recovered. The decomposition of recovered pure amine hydrochloride gives the corresponding pure amine.

Still another method which has been proposed for the separate recovery of dimethylamine and trimethylamine from a mixture of the amines is that of solvent extraction. In this method the amines are recovered by using solvents having greater solubility for one of the amines than for the other.

I have now found that dimethylamine and trimethylamine can be separately recovered from mixtures of the amines without resorting to complex processes using a plurality of distillation units, cumbersome fractional crystallization methods, or extractions by selective solvents. According to the process of my invention, the amines are separately recovered by a single fractional distillation operation. The process is based on my discovery that azeotropic mixtures of di- and trimethylamine are not formed at pressures below 500 mm. Hg absolute.

The process of this invention is carried out by introducing a mixture of di- and trimethylamine into a suitable fractionating or rectifying tower operated at a head pressure less than about 500 mm. Hg absolute. The trimethylamine is distilled from the mixture and pure dimethylamine remains undistilled. The conditions of operation with respect to such variables as rate of feed to the distillation system and reflux ratio will, of course, vary with other factors such as the particular column design, the pressure and the degree of purity desired in the products.

The process of the invention is suitably carried out as a continuous distillation operation in a plate-type rectifying column of the kind conventionally used in commercial distillation operations. Such rectifying columns are divided into a series of distillation zones and are adapted to permit the flow of distilled vapors from each zone upward into contact with liquid being distilled in the next preceding zone. Liquid from each distillation zone flows countercurrent to the ascending distilled vapors into the next lower or following distillation zone. Packed rectifying towers may also be used.

According to preferred processes of this invention, a mixture of dimethylamine and trimethylamine is introduced into a distillation zone which is one of a series of connected distillation zones. In each of the distillation zones, there is maintained a liquid having a greater content of trimethylamine than the next preceding zone. A portion of the liquid in each zone is distilled and the vapors from the distillation in each zone are passed into contact with the liquid in the next succeeding zone whereby the liquid in the next succeeding zone is heated to effect the aforementioned distillation. Undistilled liquid from each of the zones is passed into the next preceding zone. The last of the distillation zones is maintained at a pressure less than about 500 mm. Hg absolute. Substantially all the trimethylamine in the mixture of dimethylamine and trimethylamine fed to the series of distillation zones is withdrawn from the last zone in the gaseous phase. Substantially pure dimethylamine in the liquid phase is withdrawn from the first of the series of distillation zones.

It is preferred that the amine mixture used as feed to the distillation operation in the practice of this invention contain at least 30 mol per cent dimethylamine.

It is to be particularly noted that it is essential to the operation of the processes of this invention that the pressure in the last of the series of connected distillation zones, that is, the pressure at the head of the rectifying column be maintained at less than about 500 mm. Hg absolute. It is this pressure in the last zone, or head, pressure which is the determining factor and the pressures in the preceding zones may and generally will be progressively higher because of pressure drop thru the series of distillation zones. For example, in a typical process of this invention, the head pressure, or pressure in the last distillation zone, may be maintained at about 300 mm. Hg absolute whereas the pressures in the succeeding zones will at the same time be progressively higher so that in the first of the zones the pressure will be about 500 mm. Hg absolute.

According to a preferred embodiment of the invention, the pressure in the last of the series of distillation zones is maintained between 100 and 350 mm. Hg absolute. Although no azeotropic mixtures are formed at pressures from 350 mm. to about 500 mm. Hg absolute and the amines can be separated at such pressures, I have found that it is much more practical because of simplification of the equipment design to use pressures of from about 100 to 350 mm. Hg absolute.

While the separation of pure dimethylamine, that is, a product containing at least 99 mol per cent dimethylamine, is readily attained by the processes of this invention, it is considerably more difficult to separate the trimethylamine in the same high degree of purity. Unless a highly refined trimethylamine is required, it will generally be more desirable to operate the distillation to obtain as the overhead product or distillate a trimethylamine containing up to as much as 5 per cent by weight as impurities.

*Example*

A methylamine mixture containing 50 mol per cent dimethylamine and the remainder substantially trimethylamine is fed continuously into a fractionating column. The column contains 80 plates. The feed is introduced onto the 30th plate counting from the bottom of the column. The pressure at the top of the column is kept at about 250 mm. Hg absolute. A reflux ratio of 10 to 1 is used.

The bottoms fraction, or the product recovered at the base of the column, contains 99.9 per cent dimethylamine and the distillate or overhead fraction contains 97 per cent trimethylamine.

I claim:

1. In a process for the separate recovery of dimethylamine and trimethylamine from a mixture of said amines, the step comprising using a pressure less than 500 mm. Hg absolute in the distillation of substantially all the trimethylamine from said mixture whereby substantially pure dimethylamine is left.

2. In a process for the separate recovery of dimethylamine and trimethylamine from a mixture of said amines, the steps comprising introducing a mixing of dimethylamine and trimethylamine into a distillation zone which is one of a series of distillation zones, maintaining in each distillation zone a liquid having a greater content of trimethylamine than the liquid in the next preceding zone, distilling a portion of the liquid in each zone, passing vapors from the distillation in each zone into contact with the liquid in the next succeeding zone whereby the liquid in the next succeeding zone is heated to effect the aforementioned distillation, passing undistilled liquid from each zone into the next preceding zone, maintaining the last of the distillation zones at a pressure less than about 500 mm. Hg absolute, withdrawing substantially all the trimethylamine from said last zone in the gaseous phase, and withdrawing substantially pure dimethylamine in the liquid phase from the first of said distillation zones.

3. In a process for the separate recovery of dimethylamine and trimethylamine from a mixture of said amines, the steps comprising introducing a mixture of dimethylamine and trimethylamine containing at least 30 mol per cent dimethylamine into a distillation zone which is one of a series of distillation zones, maintaining in each distillation zone a liquid having a greater content of trimethylamine than the liquid in the next preceding zone, distilling a portion of the liquid in each zone, passing vapors from the distillation in each zone into contact with the liquid in the next succeeding zone whereby the liquid in the next succeeding zone is heated to effect the aforementioned distillation, passing undistilled liquid from each zone into the next preceding zone, maintaining the last of the distillation zones at a pressure of from 100 to 350 mm. Hg absolute, withdrawing substantially all the trimethylamine from said last zone in the gaseous phase, and withdrawing substantially pure dimethylamine in the liquid phase from the first of said distillation zones.

DALE F. BABCOCK.

REFERENCES CITED

The following references are of record in the file of this patent:

UNITED STATES PATENTS

| Number | Name | Date |
|---|---|---|
| 1,676,700 | Lewis | July 10, 1928 |
| 2,045,929 | Swallen | June 30, 1936 |
| 2,049,486 | Babcock | Aug. 4, 1936 |
| 2,061,889 | Andrews | Nov. 24, 1936 |
| 2,091,636 | Herold et al. | Aug. 31, 1937 |
| 2,324,255 | Britton | July 13, 1943 |

OTHER REFERENCES

Young: "Distillation Principles and Processes," published 1922 by MacMillan and Co. Ltd., St. Martins Street, London, England. Copy in Div. 6, pages 59, 60, 61.